United States Patent [19]

Kagerer

[11] 4,440,050
[45] Apr. 3, 1984

[54] DRIVE MECHANISM FOR A FEED SCREW

[75] Inventor: Franz Kagerer, Munich, Fed. Rep. of Germany

[73] Assignee: Friedrich Deckel Aktiengesellschaft, Munich, Fed. Rep. of Germany

[21] Appl. No.: 260,858

[22] Filed: May 6, 1981

[30] Foreign Application Priority Data

May 14, 1980 [DE] Fed. Rep. of Germany ....... 3018520

[51] Int. Cl.³ ............................................. B23B 21/00
[52] U.S. Cl. ...................................... 82/21 B; 74/625; 82/22; 82/27; 408/129; 409/219
[58] Field of Search ................. 82/21 B, 27, 24 R, 22; 408/129, 130; 74/424, 424.5, 424.6, 424.7, 625; 192/0.08, 0.082, 0.062; 29/65; 409/219, 156

[56] References Cited

U.S. PATENT DOCUMENTS

| | | | |
|---|---|---|---|
| 2,739,678 | 3/1956 | Parker | 192/0.08 |
| 3,930,422 | 1/1976 | Morimatsu | 74/625 |

FOREIGN PATENT DOCUMENTS 484549 of 0000 Fed. Rep. of Germany .
1296989 of 0000 Fed. Rep. of Germany .

Primary Examiner—William R. Briggs
Assistant Examiner—Lawrence Meier
Attorney, Agent, or Firm—Flynn, Thiel, Boutell & Tanis

[57] ABSTRACT

Drive mechanism for a feed screw or threaded spindle for tool machines. The threaded spindle is drivable both by a drive motor and also by a handwheel which can be coupled by an axial shifting movement of a control rod. The drive connection between the drive motor and the threaded spindle is released through an axial movement of the handwheel, so that the output shaft on the motor on the one hand is not moved in response to a rotational movement of the handwheel and, on the other hand, cannot drive the threaded spindle in the case of an unintended start.

3 Claims, 4 Drawing Figures

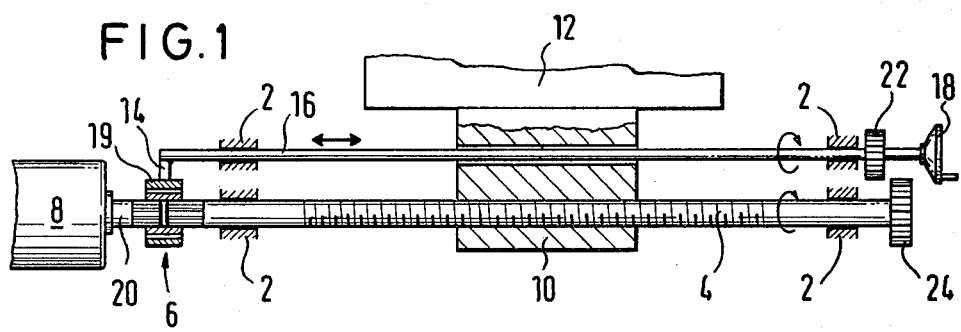
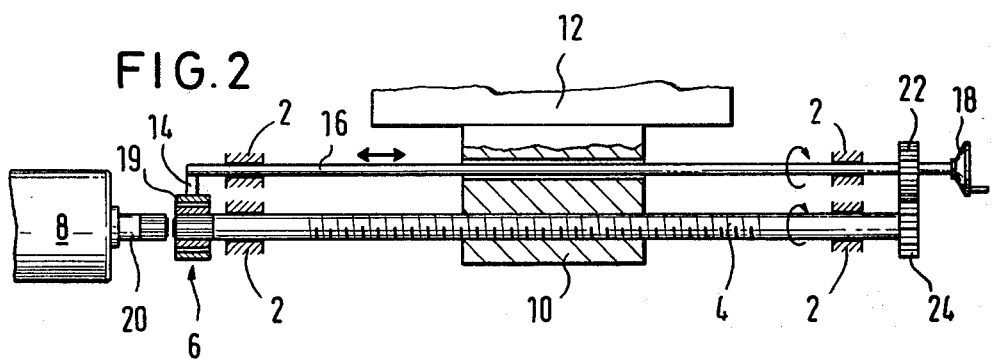
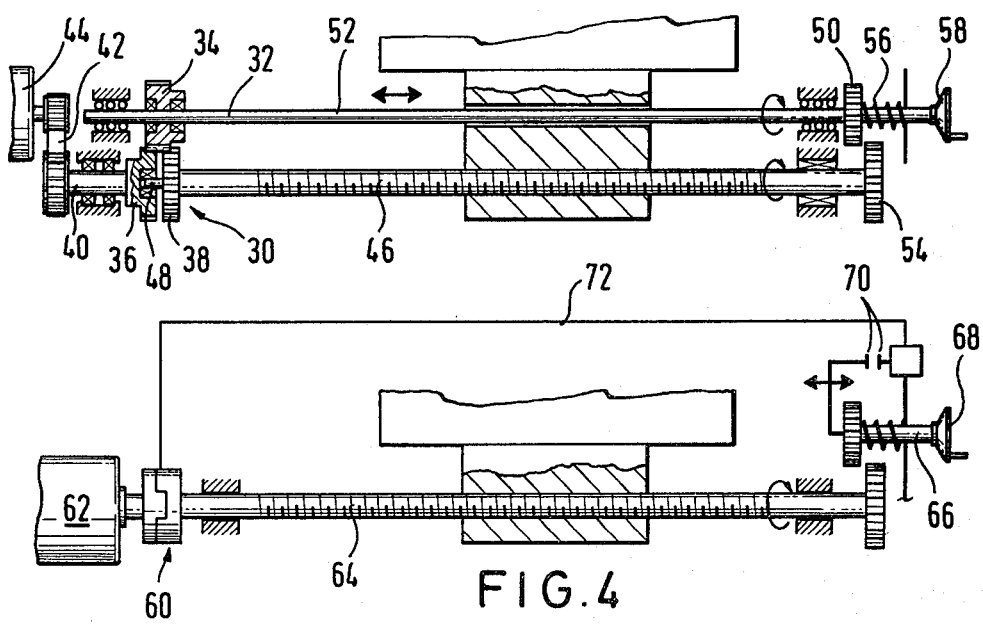

DRIVE MECHANISM FOR A FEED SCREW

FIELD OF THE INVENTION

The invention relates to a drive mechanism for a feed screw in a tool machine and, more particularly, to a spindle drive which is selectively operable by a motor or by a hand crank.

BACKGROUND OF THE INVENTION

In some tool machines there exists the demand that its adjusting and/or feed movements are to be able to be carried out both manually and also by a motor. The handwheel is generally only drivingly coupled when it is operated; it is uncoupled for safety reasons during a motor-driven operation of the spindle or feed screw.

During the manual phase of operation, it is necessary to overcome, aside from the unavoidable feed forces which act onto the threaded spindle, also yet the mass forces of the motor drive which is connected to the threaded spindle. The drive motor itself with its relatively large flywheel mass hingers very considerably a precise adjustment.

It is therefore the purpose of the invention to provide a drive mechanism for a threaded spindle wherein the motor drive is uncoupled from the threaded spindle during the manual operation phase in a simple manner which prevents the occurrence of operating errors.

This purpose is inventively attained by providing a threaded spindle which can be driven both by a drive motor and also by a handwheel, and can become coupled by an axial movement of a control rod on which the handwheel is mounted. The drive connection between the drive motor and the threaded spindle is released through an axial movement of the handwheel so that the output shaft on the motor, on the one hand, is not moved in response to a rotational movement of the handwheel and, on the other hand, cannot drive the threaded spindle in the case of an unintended start.

The coupling mechanism between the drive motor and threaded spindle is generally engaged, namely, these two structural elements are operatively connected. At the same time, the handwheel is uncoupled. In this operating condition, the machine is adjusted for motor feed drive, as it exists for example in the case of a controlled operation.

If the operator engages the handwheel through an axial movement of the handwheel shaft, the motor drive is then automatically uncoupled so that during a manual operation the output shaft thereof does not need to be moved along. An erroneous running along of the handwheel during motor operation is not possible.

The coupling mechanism, which during engagement of the handwheel effects an uncoupling of the motor drive, can be realized in different ways. It can, for example, be mechanical, electro-mechanical, electro-pneumatical or the like.

In a preferred embodiment of the invention, the coupling mechanism is connected to the handwheel through a mechanical linkage or the like. Such a construction is structurally very simple and inexpensive and assures a particularly high safety against breakdown.

It is thereby inventively provided that the drive motor and the coupling mechanism are arranged at one end of the threaded spindle, the handwheel at the other end of the threaded spindle, so that both drives do not hinder one another structurally. Both drives are each capable of becoming drivingly connected to one of the ends of the threaded spindle so that both in the case of a manual and also in the case of a motor operation, the shortest possible power paths and thus small elastic variations exist. The handwheel is, for example, connected to a control rod which is arranged parallel to the threaded spindle and is supported for longitudinal movement, and which control rod in turn is operatively connected to the coupling mechanism between the drive motor and the threaded spindle.

In a different embodiment, it is provided that the coupling mechanism between the drive motor and the threaded spindle is operated through a servodrive controlled through a control switch or the like connected directly or indirectly to the handwheel. Such a construction offers mainly advantages when for space reasons a purely mechanical operating mechanism is not, or only with difficulties, possible. The servodrive can be, for example, an electromagnetic, a hydraulic or pneumatic drive.

Several exemplary embodiments of the invention are illustrated in the accompanying drawings and are described in greater detail hereinafter.

BRIEF DESCRIPTION OF THE DRAWINGS

In the drawings:

FIG. 1 is a schematic illustration of a drive mechanism having a mechanical linkage for operating the motor coupling;

FIG. 2 is an illustration according to FIG. 1 with an engaged handwheel and disengaged motor;

FIG. 3 is a schematic illustration approximately according to FIG. 1, however, having a differently designed motor coupling; and FIG. 4 is a schematic illustration of a drive mechanism having an electrically operated motor coupling.

DETAILED DESCRIPTION

The drive mechanism which is illustrated in FIGS. 1 and 2 includes a threaded spindle 4 which is rotatably supported in a machine frame 2; however, is axially nonmovably supported and can be releasably drivingly coupled to a drive motor 8 through a coupling mechanism 6. The threaded spindle 4 serves to move a spindle nut 10 axially along the spindle in response to a rotation thereof. The spindle nut 10 is connected to a machine carriage 12 or the like. The coupling mechanism 6 is connected through a mechanical linkage 14,16 to a handwheel 18. The mechanical linkage includes a control rod 16 which is rotatably supported but nonmovable in the longitudinal direction in the machine frame 2. The control rod 16 has at its one end, which in FIGS. 1 and 2 is the right end, a fixedly arranged handwheel. The other end of the control rod 16 is connected to a movable coupling sleeve 19. The coupling sleeve 19 can be moved to two positions by the control rod, namely, the position illustrated in FIG. 1 wherein the control rod connects the shaft 20 of the drive motor 8 to the threaded spindle 4, and the position which is shown in FIG. 2 wherein the shaft 20 is uncoupled from the threaded spindle 4.

In the region of the handwheel end of the control rod 16, a gear 22 is arranged, which engages in a first position of the control rod 16, which position is shifted to the right, a gear 24 fixedly arranged on the threaded spindle 4 (FIG. 2). In this position, the drive mechanism is adjusted for manual operation; that is, the drive motor 8 is uncoupled. If the handwheel is moved to the left to a second position as shown in FIG. 1, for example through a not illustrated spring (not illustrated in this embodiment), then the drive motor is again connected by means of the coupling mechanism 6 to the threaded spindle 4, while the handwheel 18 is uncoupled.

FIG. 3 illustrates a different exemplary embodiment of a coupling mechanism 30. A gear 34 is rotatably and axially nonmovably arranged on the rotatable and movable control rod 32. In the illustrated position of the control rod 32, the gear 34 mates with two gears 36,38 of the same pitch. The gear 36 is connected through a shaft 40, a toothed belt 42 and belt carrying gears to the drive motor 44. The gear 38 is connected to the threaded spindle 46. (The threaded spindle 46 is rotatably supported in the gear 36 with its journal extension 48). The gear 34 couples in the illustrated position the two gears 36 and 38, so that the drive mechanism is adjusted for motor operation. The gear 50 on the control rod 52 adjacent the handwheel 58 does not engage the gear 54 of the threaded spindle 46.

If the control rod 52 is moved against the force of the return spring 56 to the right, the gears 50 and 54 will then engage, while the gear 34 disengages from the gear 36. In this position, the drive mechanism is adjusted for operation by means of the handwheel 58. Since the gear 34 is rotatably supported on the control rod, different speeds become easily possible between the gear 34 and the control rod, for example due to a suitable translation of the gears 50,54.

FIG. 4 illustrates an arrangement in which the coupling mechanism 60 between the drive motor 62 and the threaded spindle 64 is constructed as an electromagnetic coupling. The electromagnetic coupling is released during a movement of the handwheel 68, which is fixedly arranged on the shaft 66, to the right, whereat the two contacts 70 come into contact with one another and effect a release of the coupling 60 through the control line 72, so that also in this arrangement either the drive motor 62 or the handwheel 68 is at all times coupled with the threaded spindle.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A drive mechanism, comprising a drive motor; an elongate threaded spindle supported for rotation about a first axis and having a first gear provided at a first location thereon coaxial with said first axis; electromagnetic coupling means cooperable with said motor and said spindle for selectively drivingly coupling said motor to said spindle; a carriage supported for movement axially of said spindle and having means thereon defining a nut which threadedly engages said spindle, rotation of said spindle effecting axial movement of said carriage; a handwheel and a second gear supported for rotation about a second axis substantially parallel to said first axis and supported for axial movement between first and second positions, said second gear being fixed against rotational and axial movement relative to said handwheel and being respectively drivingly engaged with and free of engagement with said first gear in said first and second positions; and including control means responsive to axial movement of said handwheel and cooperable with said electromagnetic coupling means for causing said electromagnetic coupling means to drivingly couple and uncouple said motor and said spindle when said handwheel and said second gear are in said second and first positions, respectively.

2. The drive mechanism according to claim 1, including resilient means for yieldably urging said handwheel and said second gear toward said second position.

3. The drive mechanism according to claim 2, wherein said control means includes a switch having two contacts, said contacts being in engagement with each other when said handwheel and said second gear are in said first position and being free of engagement with each other when said handwheel and said second gear are in said second position.

* * * * *